US010486570B2

(12) United States Patent
Hayashi et al.

(10) Patent No.: US 10,486,570 B2
(45) Date of Patent: Nov. 26, 2019

(54) VEHICLE HEADREST

(71) Applicant: TOYOTA BOSHOKU KABUSHIKI KAISHA, Aichi-ken (JP)

(72) Inventors: Koji Hayashi, Aichi-ken (JP); Hisaya Mori, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/896,144

(22) Filed: Feb. 14, 2018

(65) Prior Publication Data

US 2018/0257533 A1 Sep. 13, 2018

(30) Foreign Application Priority Data

Mar. 13, 2017 (JP) ................................ 2017-047087

(51) Int. Cl.
*B60N 2/885* (2018.01)
*B60N 2/838* (2018.01)

(52) U.S. Cl.
CPC ............. *B60N 2/885* (2018.02); *B60N 2/838* (2018.02)

(58) Field of Classification Search
CPC ................................ B60N 2/885; B60N 2/838
USPC .......................................................... 297/391
See application file for complete search history.

(56) References Cited

U.S. PATENT DOCUMENTS

2004/0217639 A1 11/2004 Clough
2010/0141008 A1 6/2010 Augade et al.

FOREIGN PATENT DOCUMENTS

JP 2007-000257 1/2007
JP 2010-512278 4/2010

OTHER PUBLICATIONS

Office Action issued in Germany Counterpart Patent Appl. No. 102018203689.6, dated Oct. 19, 2018 , along with an English translation thereof.

*Primary Examiner* — Anthony D Barfield
(74) *Attorney, Agent, or Firm* — Greenblum & Bernstein, P.L.C.

(57) ABSTRACT

A vehicle headrest including: a main portion including a central part of a front surface of the headrest; a side portion including a side part of the front surface of the headrest, the side portion including a lower side portion and an upper side portion which are divided from each other in a height direction; a first hinge shaft coupling the side portion to the main portion in a state where the side portion is capable of protruding forward to a side support position by being rotated around an axis which extends in the height direction and is inclined downward and inward in a width direction; and a second hinge shaft coupling the lower side portion to the upper side portion in a state where the lower side portion is capable of being raised forward around an axis extending in the width direction.

4 Claims, 15 Drawing Sheets

VEHICLE HEADREST

CROSS-REFERENCE TO RELATED APPLICATIONS

This application claims priority from Japanese Patent Application No. 2017-047087 filed on Mar. 13, 2017, the entire contents of which are incorporated herein by reference.

TECHNICAL FIELD

The disclosure relates to a vehicle headrest, and particularly to a vehicle headrest including a main portion including a central part of front surface of the headrest and a side portion including a side part of the front surface of the headrest.

BACKGROUND

In a vehicle seat, there has been known a headrest for supporting a head of a seated person from a rear side thereof which includes a side support portion which can also support the head of the seated person from a lateral side thereof (see JP-A-2010-512278). The side support portion is coupled to a side of the main portion for supporting the head of the seated person from the rear side thereof in a state where the side support portion is capable of being hinge-rotated forward so that the head of the seated person can be supported from the lateral side thereof. Since the headrest includes the side support portion, the headrest can support the head of the seated person in a form of wrapping the head from the rear side thereof to the lateral side thereof.

In the related art, the side support portion is hinge-rotated obliquely upward with respect to the main portion, so that a temporal part of the head can be supported from an obliquely lower side thereof. However, since the side support portion is configured such that an obliquely raising flat surface thereof abuts against the temporal part of the head so as to support the head, the temporal part of the head cannot be adequately supported from a lower side thereof in an angle of performing the support from the lateral side.

SUMMARY

The disclosure has been made to solve the above problem, and the problem to be solved by the disclosure is to arrange a side support portion which can properly support a head of a seated person from both lateral side and lower side thereof in a vehicle headrest.

According to an aspect of the disclosure, there is provided a vehicle headrest including: a main portion including a central part of a front surface of the headrest; a side portion including a side part of the front surface of the headrest, the side portion including a lower side portion on a lower side and an upper side portion on an upper side which are divided from each other in a height direction; a first hinge shaft coupling the side portion to the main portion in a state where the side portion is capable of protruding forward to a side support position by being rotated around an axis which extends in the height direction and is inclined downward and inward in a width direction, the side support position being a position at which a head of a seated person is capable of being supported by the side portion from a lateral side thereof; and a second hinge shaft coupling the lower side portion to the upper side portion in a state where the lower side portion is capable of being raised forward around an axis extending in the width direction.

DETAILED DESCRIPTION

Hereinafter, modes for carrying out the disclosure will be described with reference to the drawings.

Embodiment 1

<Schematic Configuration of Headrest 1>

Figure 1:
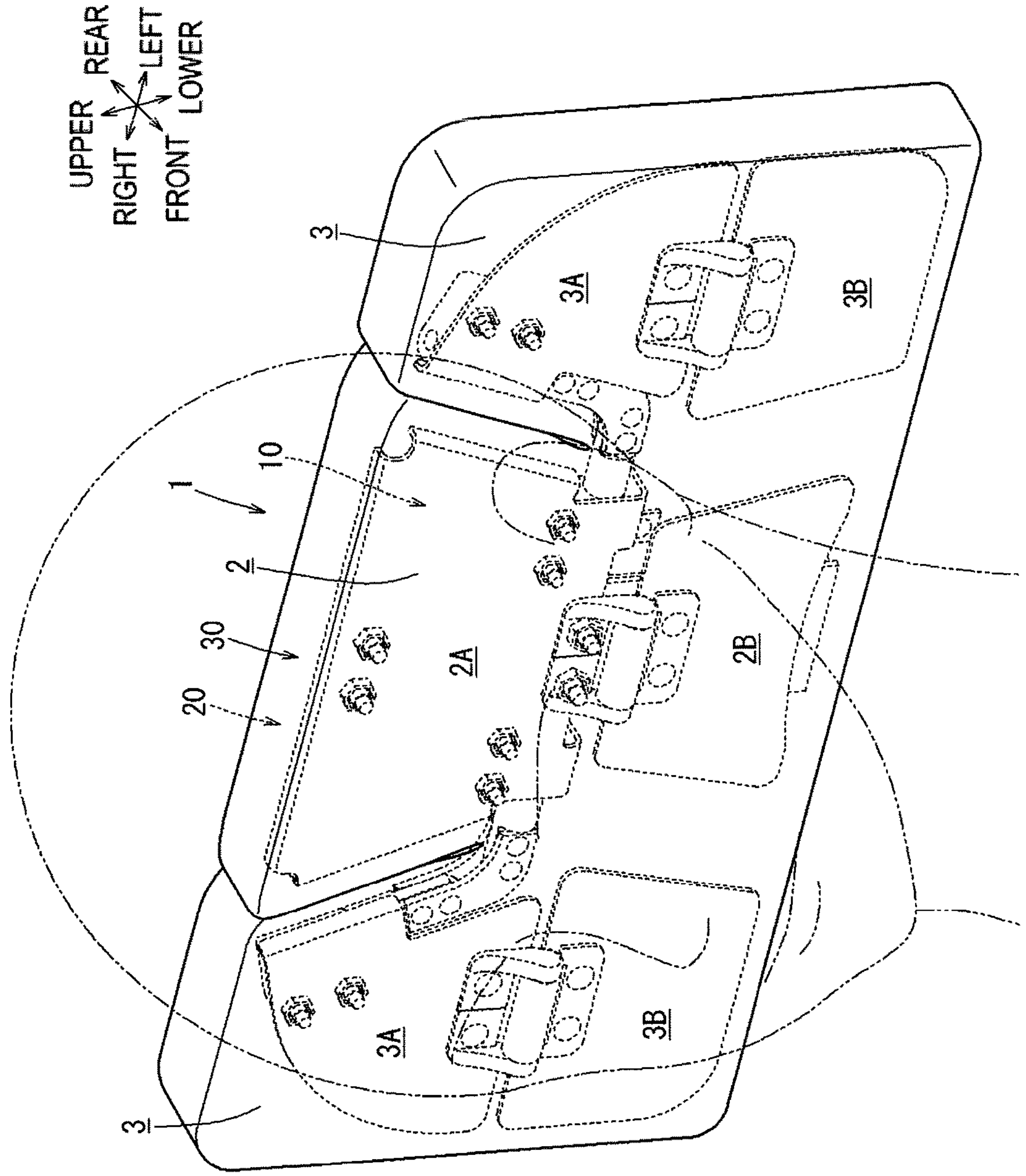
FIG. 1 is a perspective view showing a schematic configuration of a headrest according to Embodiment 1.

First, a configuration of a headrest 1 according to Embodiment 1 will be described with reference to FIGS. 1 to 13. Incidentally, in the following description, each direction such as front, rear, upper, lower, left, and right directions refer to directions shown in each drawing. As shown in FIG. 1, the headrest 1 of the present embodiment is configured as a head-rest portion of a seat (not shown) of an automobile.

Specifically, the headrest 1 is provided to be mounted on an upper portion of a seatback of the seat (not shown). The headrest 1 includes a main portion 2 which includes a central part of a front surface of the headrest 1 and side portions 3 which are located on left and right sides of the main portion 2 and include side parts of the front surface of the headrest 1.

The headrest 1 is configured such that the main portion 2 and the side portions 3 are kept in a state of forming a substantially flush front surface with each other in an initial state of the headrest 1. With the above configuration, the headrest 1 can abut and support the head of the seated person from a rear side thereof with the main portion 2 and each side portion 3.

Figure 2:
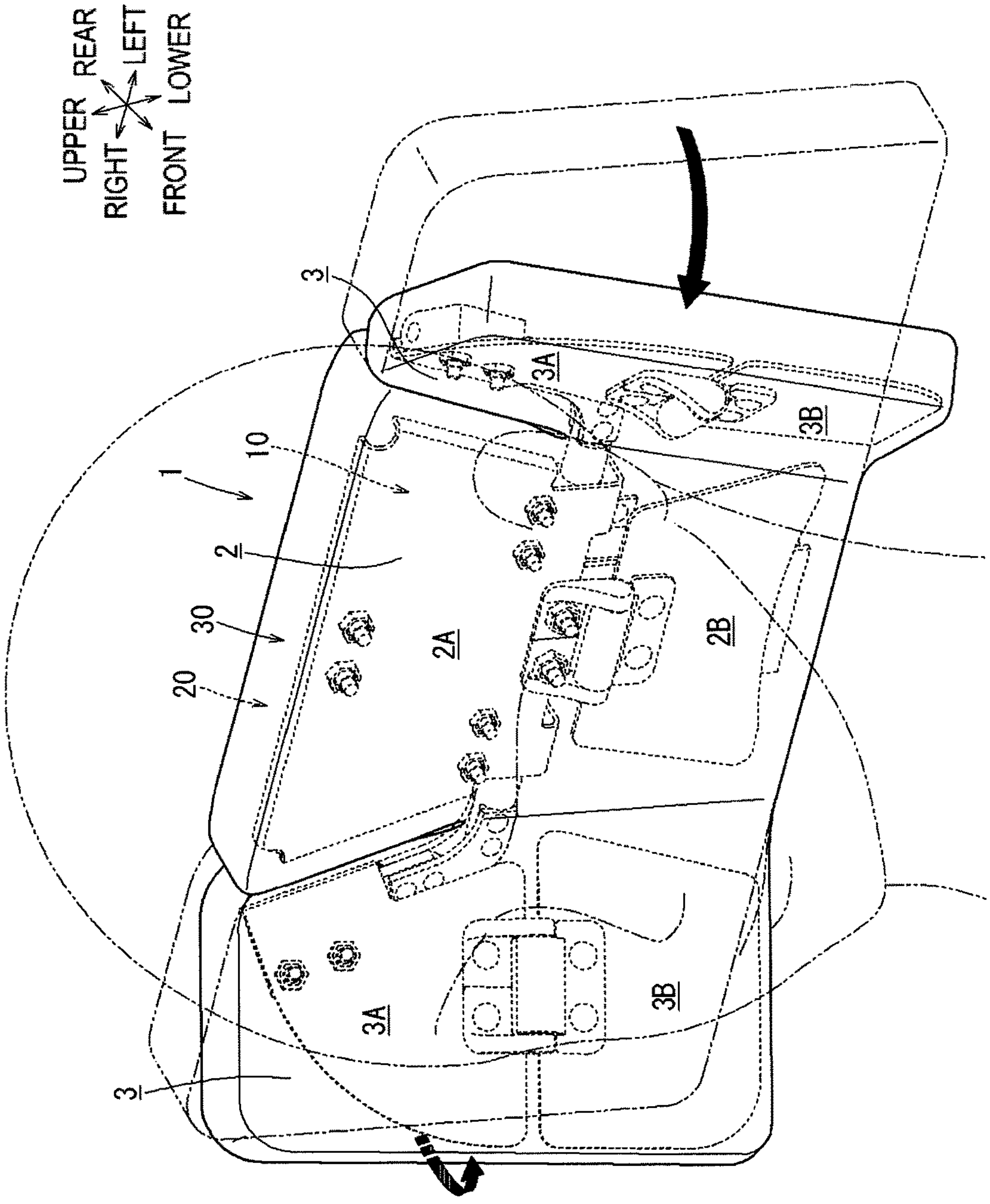
FIG. 2 is a perspective view showing a state where each side portion protrudes to a side support position.

However, as described in detail later, the headrest 1 includes an internal frame 10 which can be rotated in a form of bending joints thereof. In this way, the headrest 1 can change a form of supporting the head of the seated person by changing the shape thereof as follows. That is, as shown in FIG. 2, each side portion 3 on the right and left is transformed in a form of being raised obliquely towards a front-upper side with respect to the main portion 2, and thus the headrest 1 is switched to a state (side support state) where the head of the seated person can be supported from a laterally obliquely lower side by each side portion 3.

Figure 3:
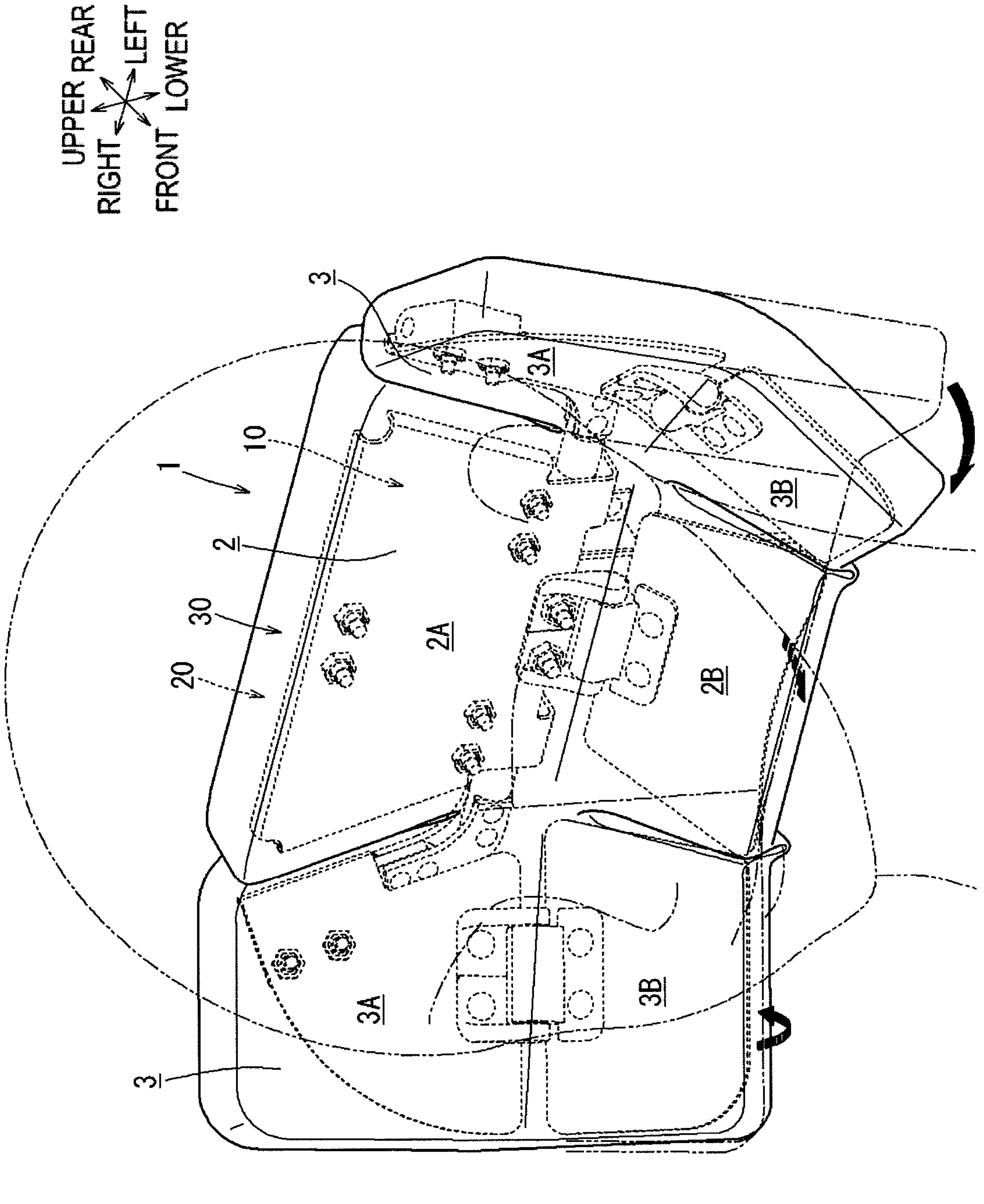
FIG. 3 is a perspective view showing a state where a lower side portion of each side portion and a lower main portion of the main portion are raised up from a state shown in FIG. 2.

Also, as shown in FIG. 3, each side portion 3 includes an upper side portion 3A on the upper side and a lower side portion 3B on the lower side which are divided from each other in the height direction. Each lower side portion 3B is transformed in a form of being raised obliquely towards a front-upper side with respect to each upper side portion 3A. Thus, the headrest 1 is further switched, from the side support state shown in FIG. 2, to a state where the head of the seated person can also be supported from a lower side by the lower side portions 3B in a form of further matching and coming into close contact with the shape of the head from a laterally lower side thereof.

Further, the main portion 2 includes an upper main portion 2A on the upper side and the lower main portion 2B on the lower side. The lower main portion 2B is further transformed in a form of being raised obliquely towards a front-upper side with respect to an upper main portion 2A. Thus, and the headrest 1 is switched to a state where the head of the seated person can also be supported from a lower side by the lower main portion 2B in a shape further matching and coming into close contact with the shape of the head from a rear lower side thereof.

Figure 4:
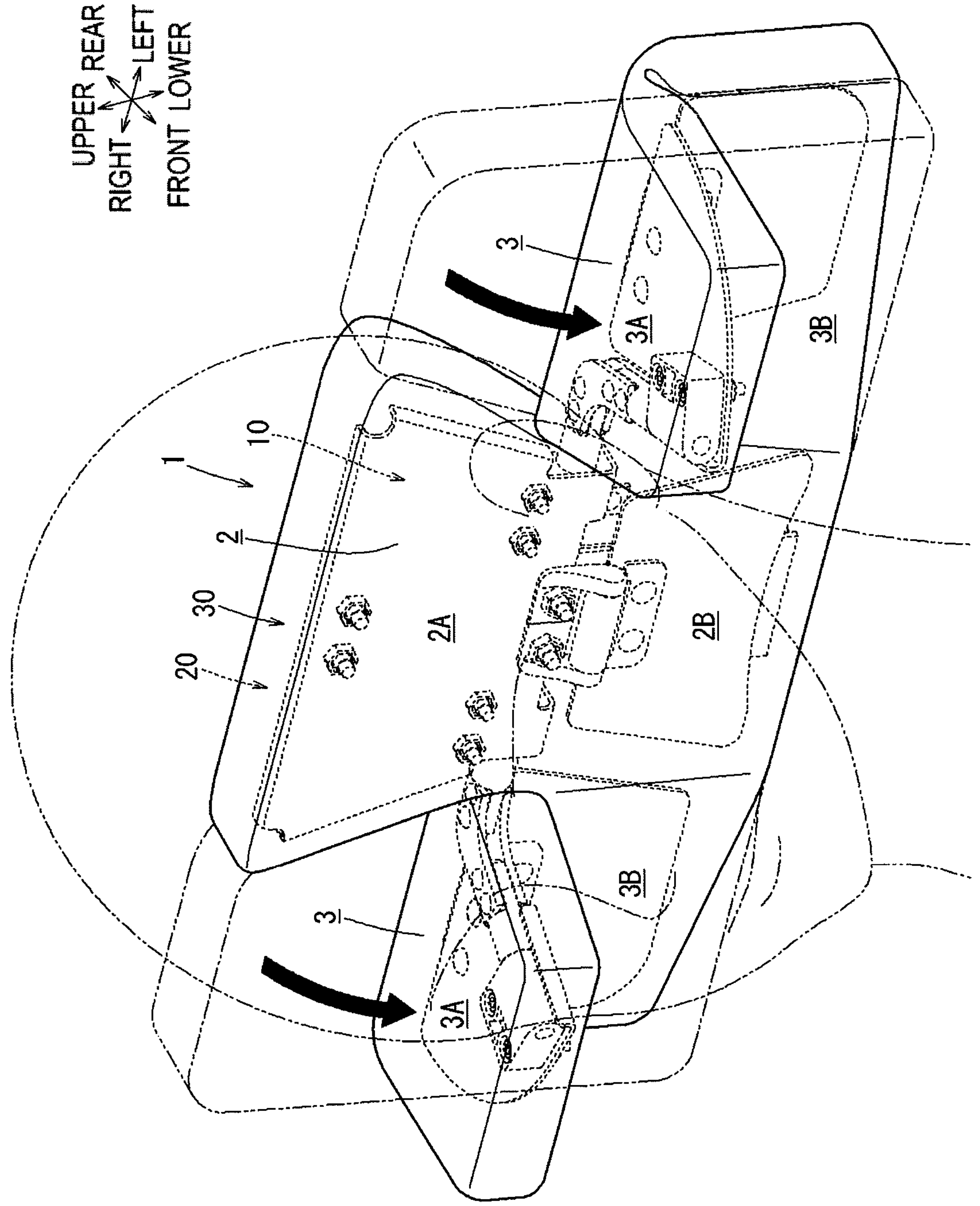
FIG. 4 is a perspective view showing a state where each side portion is tilted down forward.

Also, as shown in FIG. 4, the upper side portion 3A of each side portion 3 is transformed in a form of being tilted down forward with respect to the main portion 2 in a form of leaving the lower side portion 3B as it is, and thus the headrest 1 is switched from the state in the initial position shown in FIG. 1 to a state where the head of the seated person can rest in a state of laying laterally and be supported by surfaces of each forward tilted down upper side portions 3A.

Figure 5:
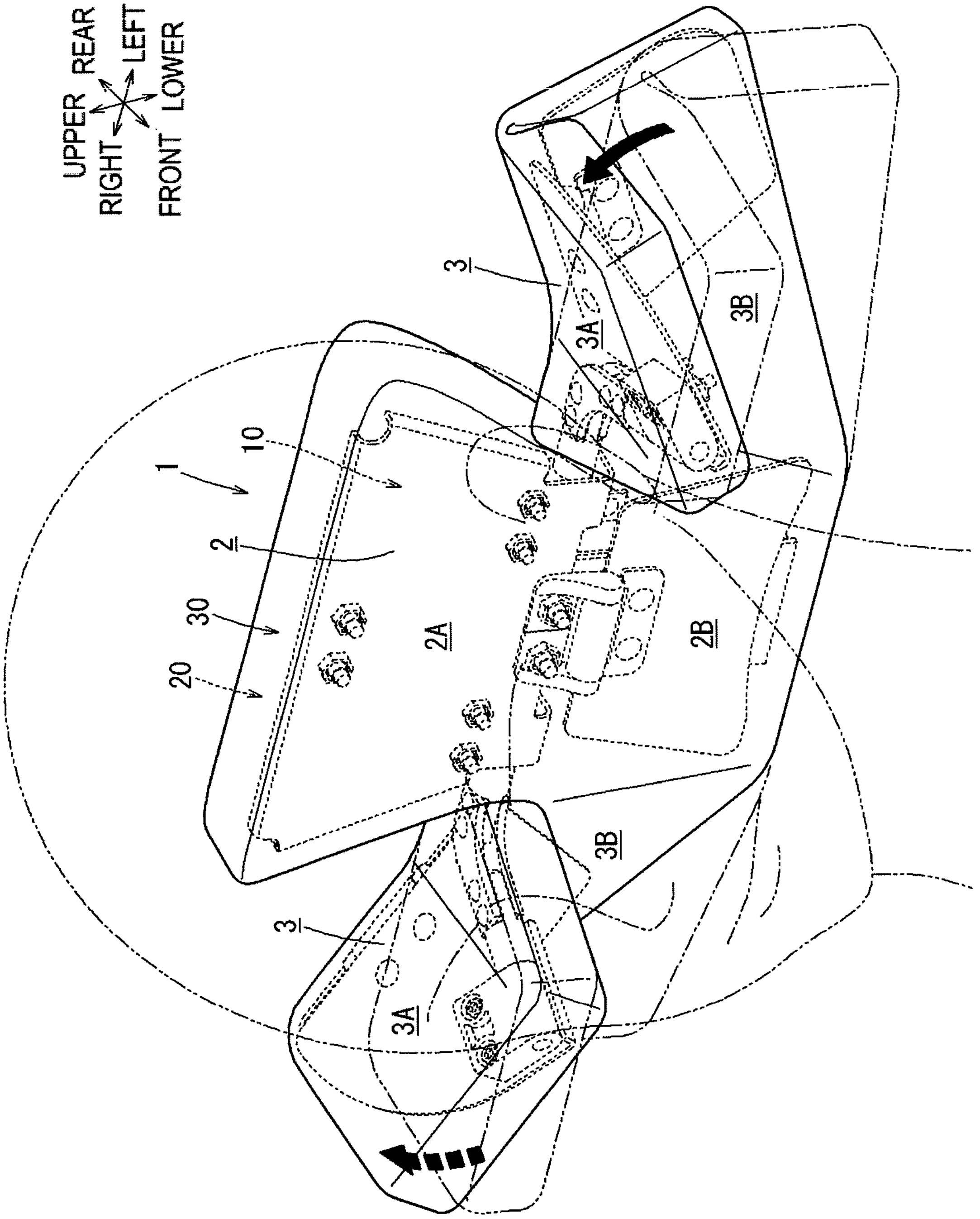
FIG. 5 is a perspective view showing a state where an upper side portion of each side portion is further raised inward obliquely from a state shown in FIG. 4.

Also, as shown in FIG. 5, the upper side portion 3A of each side portion 3 of the headrest 1 can be transformed in a form of being further raised obliquely inward in a form of leaving the lower side portion 3B on the lower side as it is from the state where each upper side portion 3A is laid forward as shown in FIG. 4. With the above transformation, an angle of supporting the head of the seated person from the laterally lower side by each upper side portion 3A of the headrest 1 can be adjusted, such as being raised obliquely.

Figure 6:
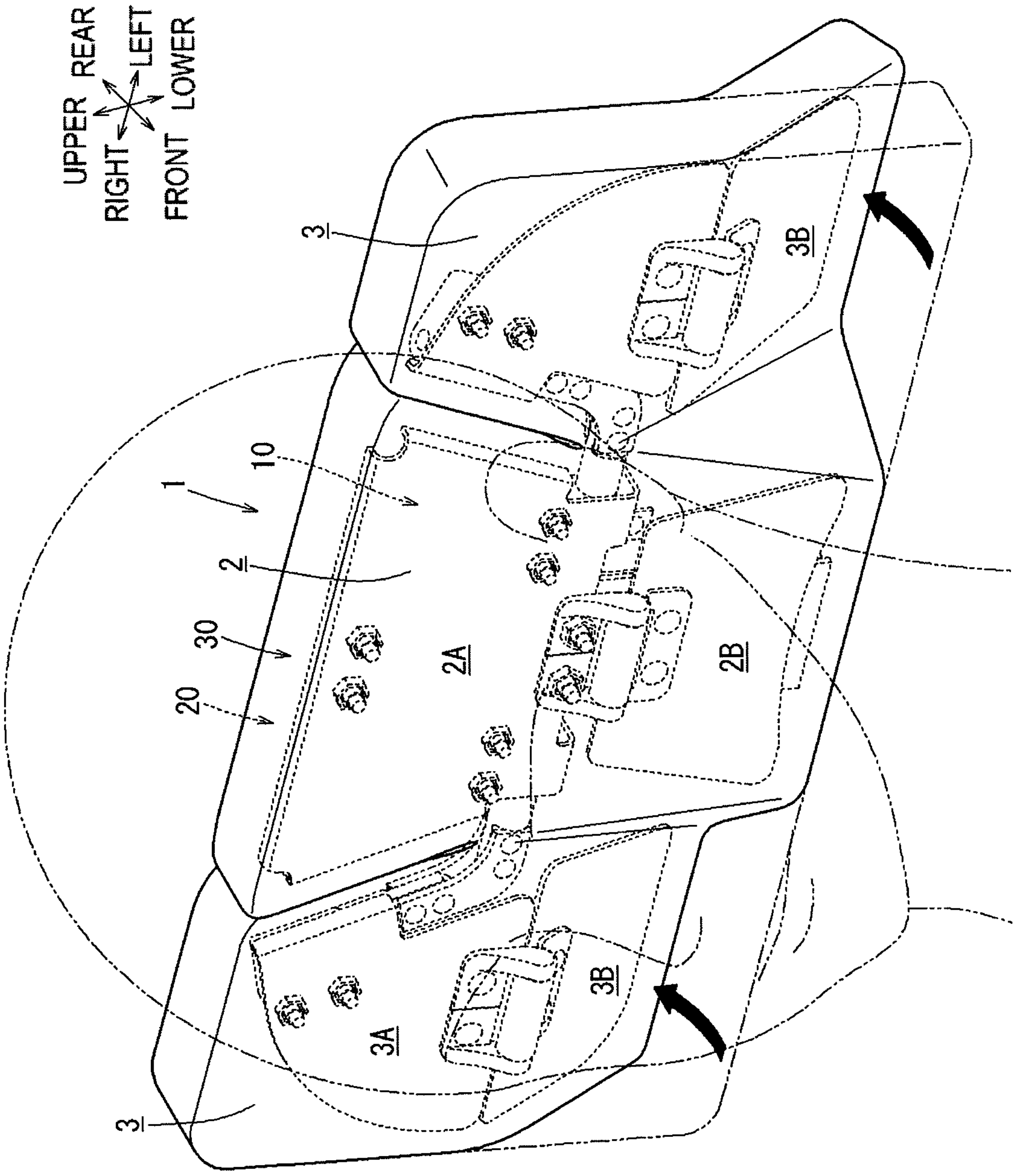
FIG. 6 is a perspective view showing a state where a lower side portion of each side portion is retracted rearward.

Also, as shown in FIG. 6, the lower side portion 3B on the lower side of each side portion 3 of the headrest 1 can be transformed in a form of being retracted rearward with respect to the main portion 2 in a form of leaving the upper side portion 3A on the upper side as it is from a state in the initial position in FIG. 1. With the above transformation, even in a case where a physical size of the seated person is large and both shoulders of the seated person are abutted with each lower side portion 3B in a state of the initial shape of the headrest 1, each lower side portion 3B can be retracted rearward and switched to a state of being not in contact with both shoulders of the seated person.

Therefore, the internal frame 10 of the headrest 1 can be rotated in a form of bending joints thereof, and thus the form of supporting the head of a seated person can be changed in various forms by a simple operation of simply applying force from the outside. Switching of the supporting form of the headrest 1 can be performed in a bilaterally asymmetric form besides the bilaterally symmetrical form.

Hereinafter, a specific configuration of the headrest 1 will be described in detail. As shown in FIG. 1, the headrest 1 is configured such that a urethane foam-made pad 20 which can elastically receive the load of the head of the seated person is set in a form of covering front, rear, upper, lower, left and right peripheral portions of the metal internal frame 10 forming a framework of the headrest 1, and a fabric cover 30 configuring a design surface of the headrest 1 is further covered to the pad 20 so as to cover the entire surface thereof.

<Internal Frame 10>

Figure 7:
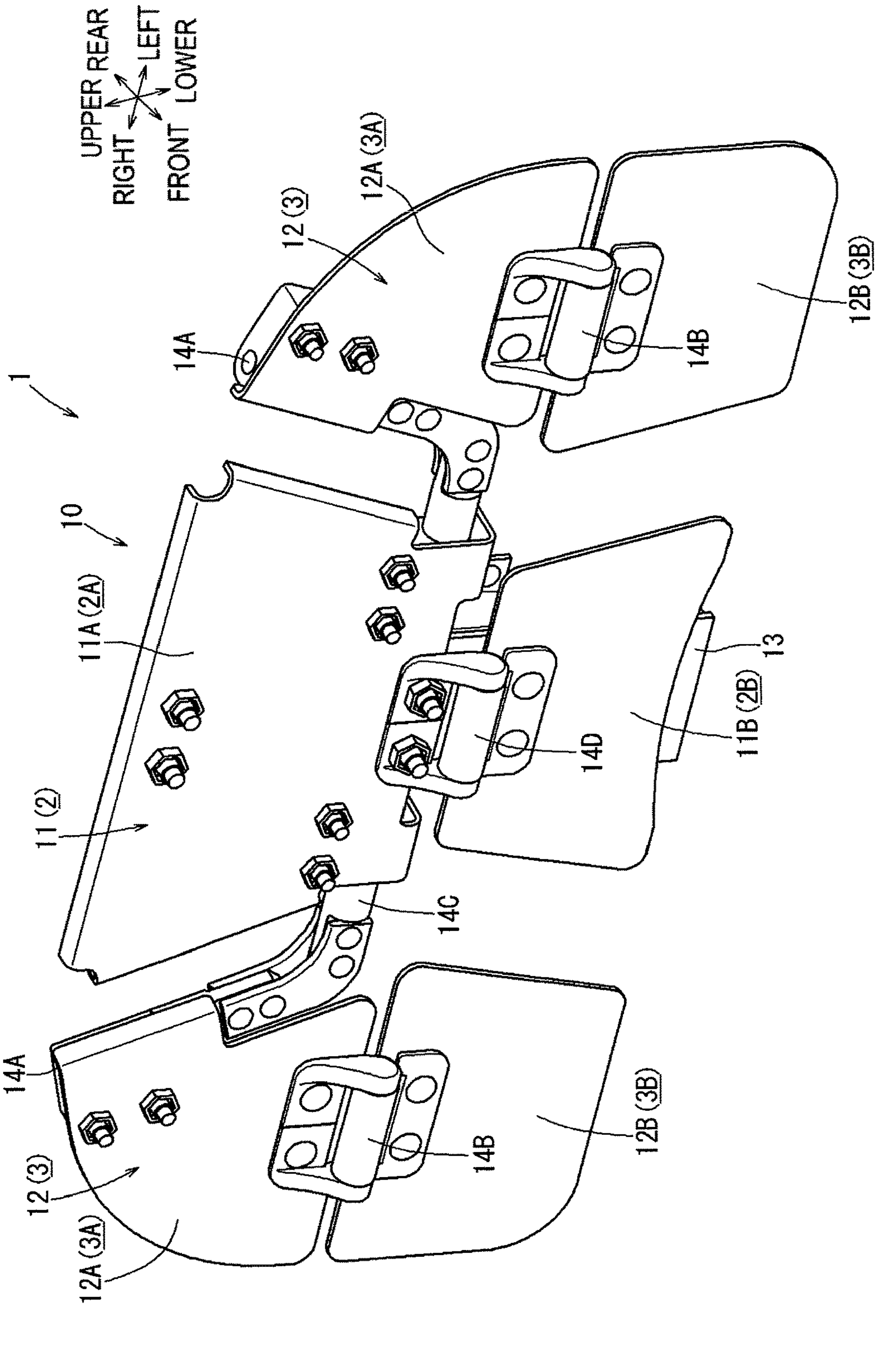
FIG. 7 is a perspective view of a framework structure of the headrest when viewed from a front side thereof.

As shown in FIG. 7, the internal frame 10 includes a main plate portion 11 which is made of a substantially plate-shaped metal plate forming a strength member in the main portion 2 of the headrest 1, and a pair of left and right side plate portions 12 which is assembled to left and right sides of the main plate portion 11 and is made of substantially plate-shaped metal plates forming strength members in the side portions 3 of the headrest 1.

Specifically, the main plate portion 11 includes an upper main plate portion 11A forming a strength member in the upper main portion 2A of the headrest 1 and a lower main plate portion 11B forming a strength member in the lower main portion 2B of the headrest 1 which are divided in the height direction and edge portions thereof on a side close to each other in the height direction are rotatably hinge-coupled by a hinge structure having a fourth hinge shaft 14D extending in the width direction. With the above configuration, as shown in FIGS. 7 to 8, by aligning the upper main plate portion 11A and the lower main plate portion 11B of the main plate portion 11 in a form of forming a substantially flush front surface, the main portion 2 of the headrest 1 can be brought to the form of the initial state shown in FIG. 1.

Figure 8:
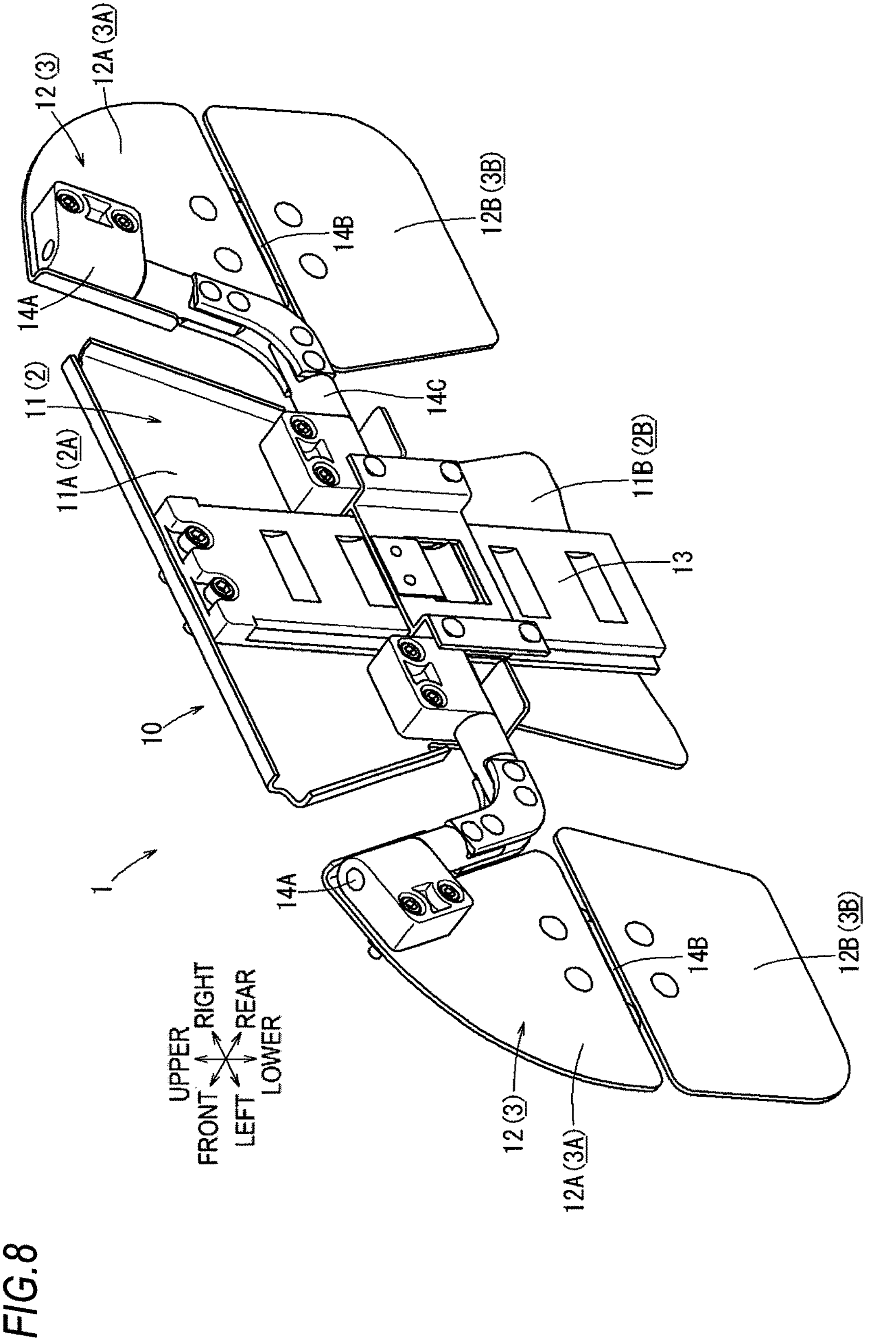
FIG. 8 is a perspective view of the framework structure of the headrest when viewed from a rear side thereof.

As shown in FIG. 8, a slide rail 13 extending downward across a rear side region of the lower main plate portion 11B is integrally attached to a central portion in the width direction on the rear side surface of the upper main plate portion 11A of the main plate portion 11. The slide rail 13 is inserted and mounted to a holding tool provided at an upper portion of the seat back (not shown) from an upper side thereof, and the slide rail 13 is configured such that a position of the headrest 1 in the height direction can be adjusted by moving the slide rail 13 to adjust a position thereof in the height direction with respect to the holding tool.

Figure 10:
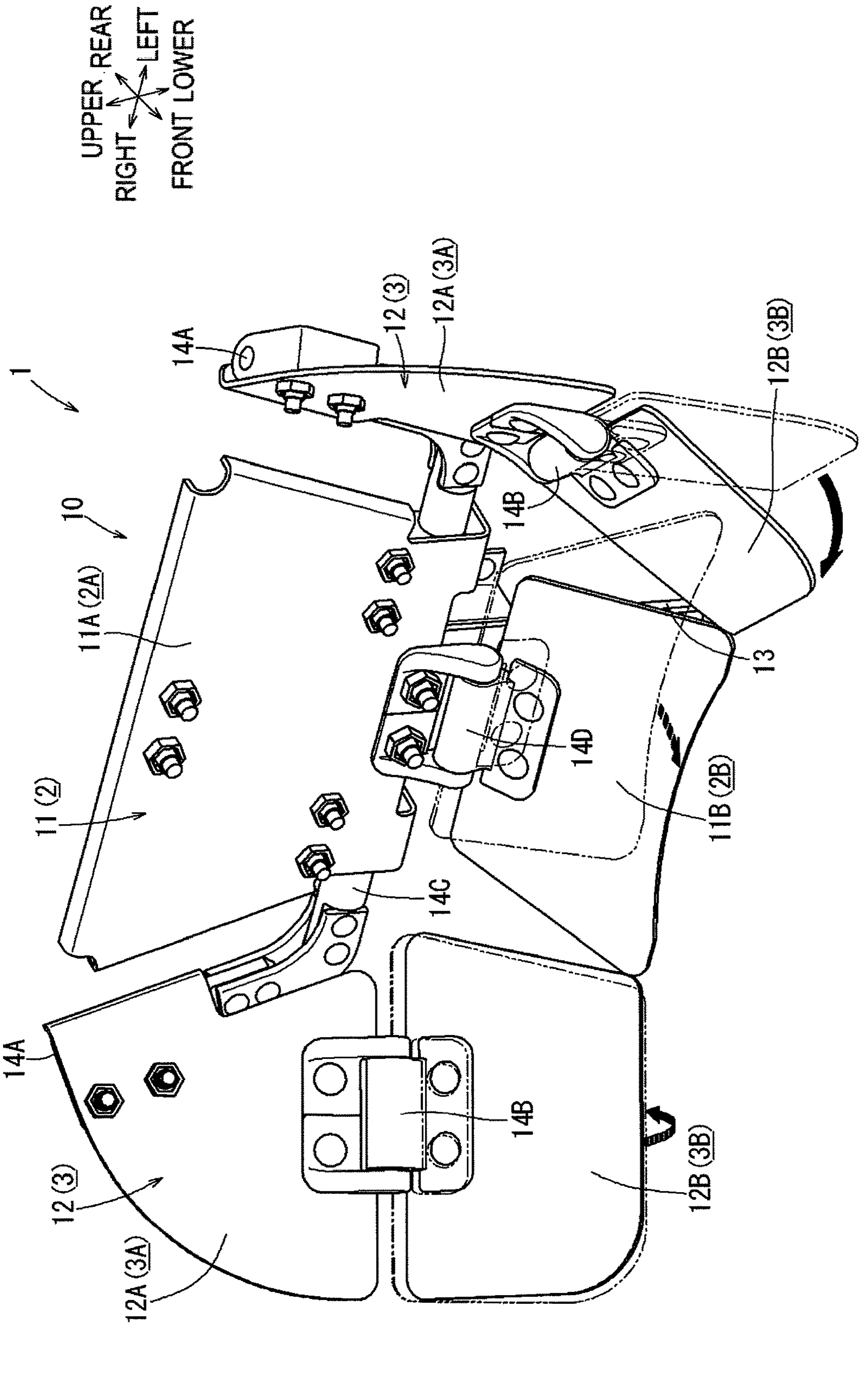
FIG. 10 is a perspective view showing a state where the framework structure of the headrest is switched to a form corresponding to FIG. 3.

Also, as shown in FIG. 10, the lower main plate portion 11B of the main plate portion 11 is pushed in a form of being raised to the front-upper side thereof around the fourth hinge shaft 14D with respect to the upper main plate portion 11A, and thus the main portion 2 of the headrest 1 can be switched to the form shown in FIG. 3. Incidentally, a rotation posture of the lower main plate portion 11B with respect to the upper main plate portion 11A of the main plate portion 11 is kept in a state of being locked by resistance force of sliding friction against the rotation around the fourth hinge shaft 14D.

As shown in FIG. 7, each side plate portion 12 includes an upper side plate portion 12A forming a strength member in each upper side portion 3A of the headrest 1 and a lower side plate portion 12B forming a strength member in each lower side portion 3B of the headrest 1 which are divided in the height direction and edge portions thereof on a side close to each other in the height direction are rotatably hinge-coupled by a hinge structure having a second hinge shaft 14B extending in the width direction. Also, each side plate portion 12 is configured such that the upper side plate portion 12A thereof is rotatably hinge-coupled to the upper man portion 11A of the main plate portion 11 by each hinge structure having a first hinge shaft 14A which extends in the height direction and is inclined downward and inward in the width direction.

The first hinge shafts 14A are integrally connected to each other by a third hinge shaft 14C which extends straightly in the width direction along a lower edge of the upper main plate portion 11A of the main plate portion 11 from lower ends of the first hinge shafts 14A. As shown in FIGS. 7 to 8, since the upper side plate portion 12A and the lower side plate portion 12B of the side plate portion 12 are aligned in a state of forming a substantially flush front surface with the above configuration, each side portion 3 of the headrest 1 can be brought to the form of the initial state shown in FIG. 1.

Figure 9:
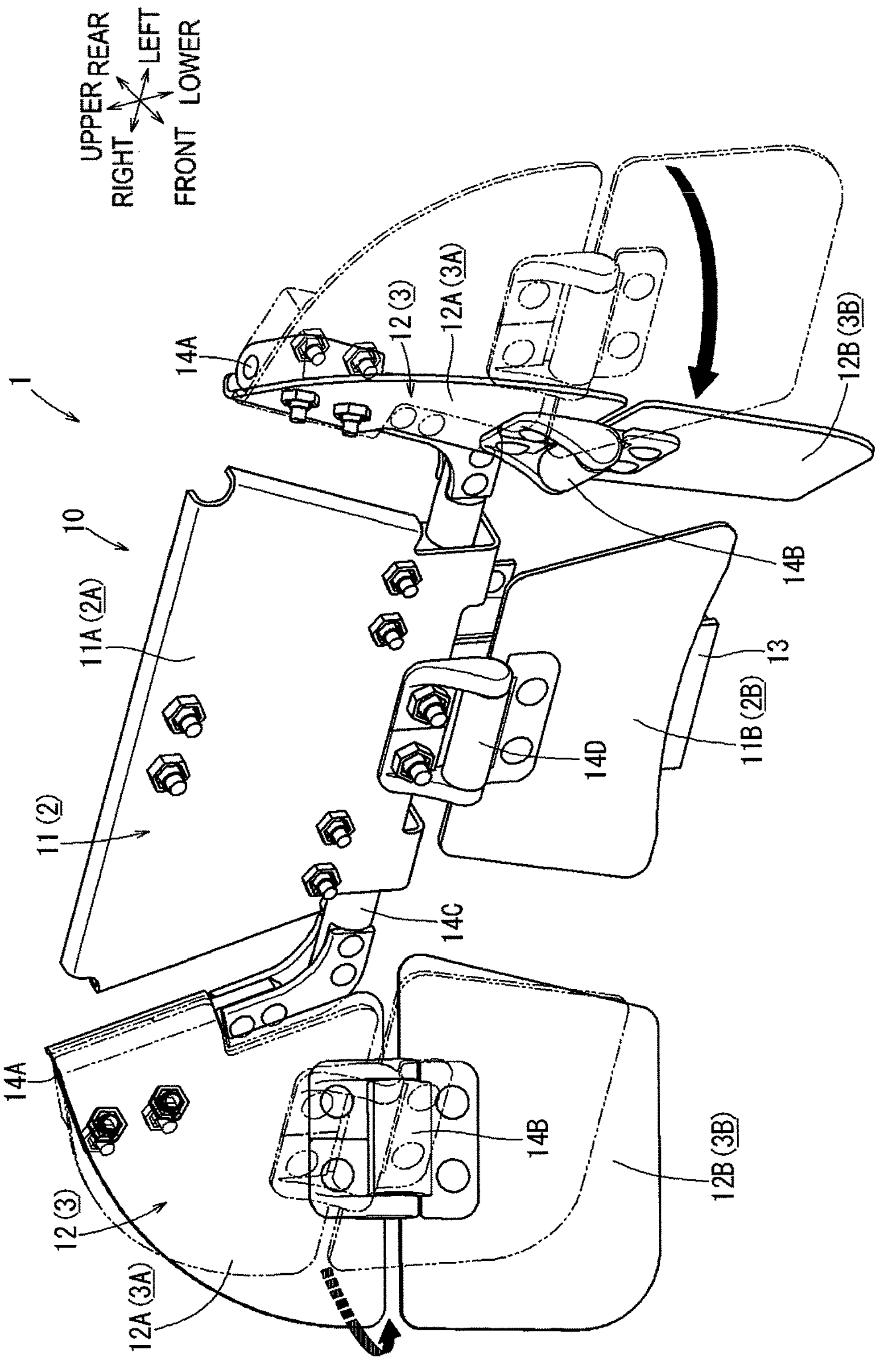
FIG. 9 is a perspective view showing a state where the framework structure of the headrest is switched to a shape corresponding to FIG. 2.

Also, as shown in FIG. 9, the upper side plate portion 12A of each side plate portion 12 is pushed in a form of protruding forward with respect to the upper main plate portion 11A around the first hinge shaft 14A, and thus each side portion 3 of the headrest 1 can be switched to the form shown in FIG. 2. As shown in FIG. 10, the lower side plate portion 12B of each side plate portion 12 is further pushed in a form of being raised towards the front-upper side with respect to the upper side plate portion 12A around the second hinge shaft 14B, and thus each lower side portion 3B of the headrest 1 can be switched to the form shown in FIG. 3.

Figure 11:
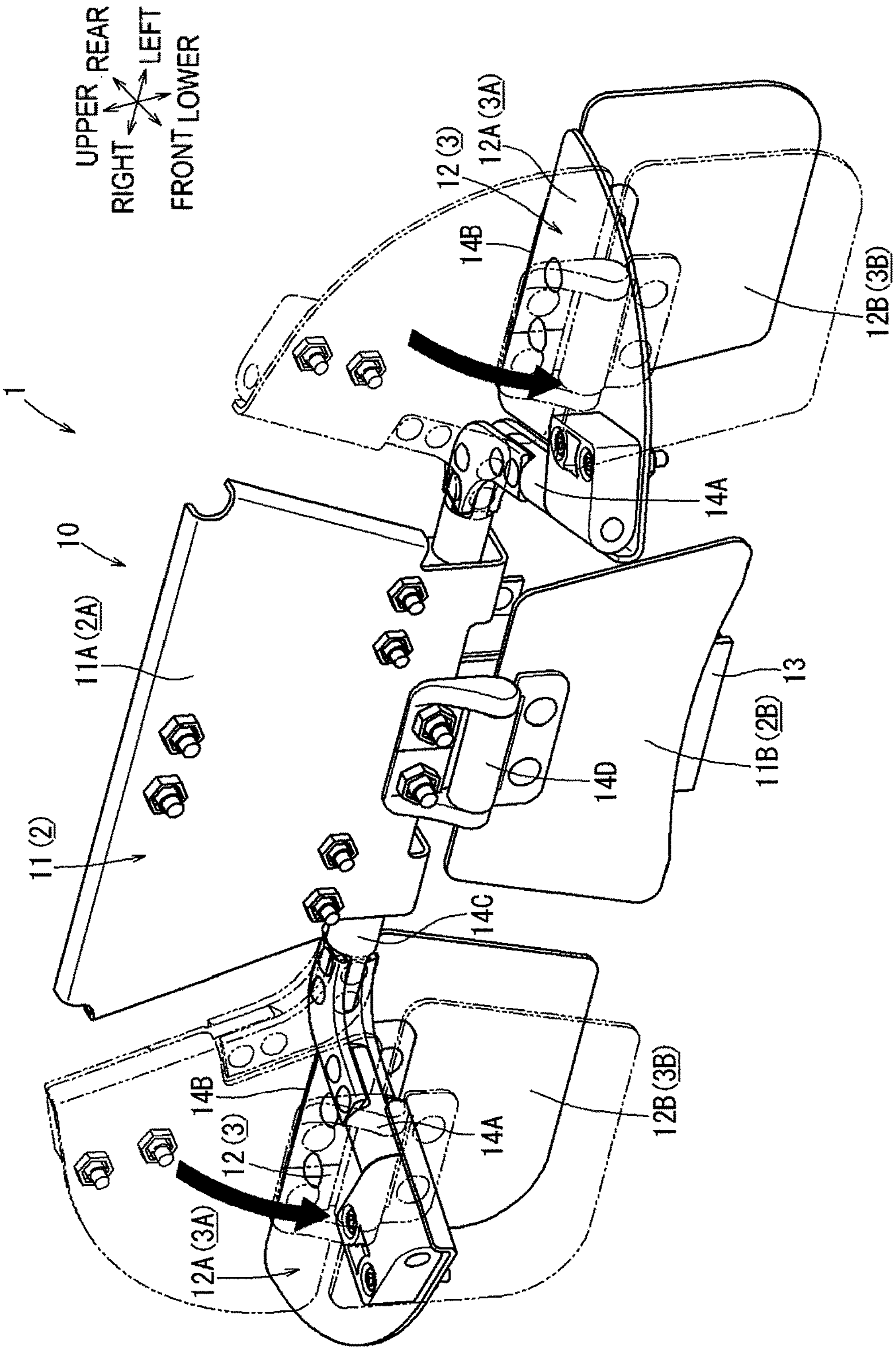
FIG. 11 is a perspective view showing a state where the framework structure of the headrest is switched to a form corresponding to FIG. 4.

Also, as shown in FIG. 11, the upper side plate portion 12A of each side plate portion 12 is pushed in a form of being tilted down forward, from the initial state shown in FIG. 7, with respect to the upper main plate portion 11A around the third hinge shaft 14C in a form of leaving the lower side plate portion 12B as it is, and thus each upper side portion 3A of the headrest 1 can be switched to the form shown in FIG. 4.

Figure 12:
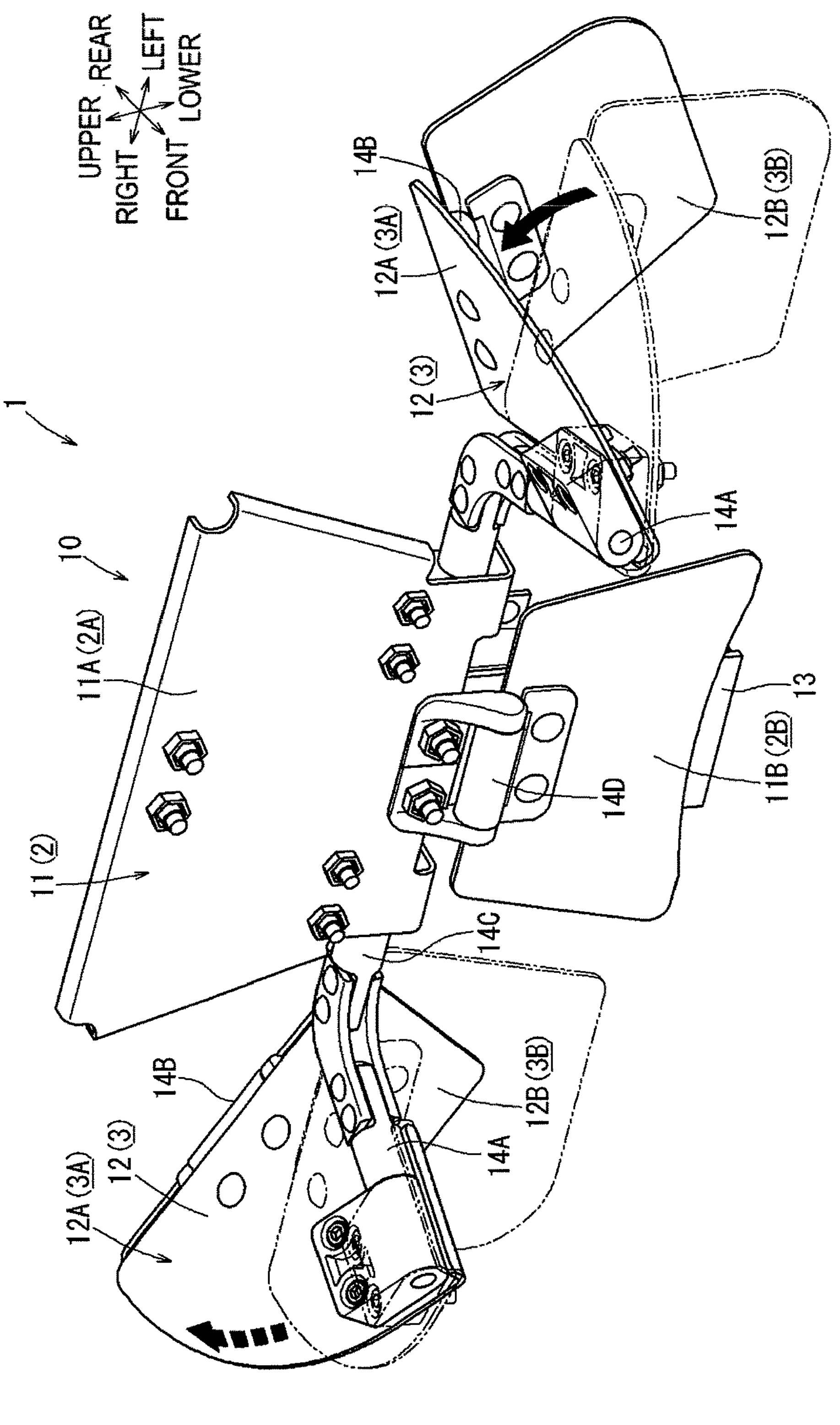
FIG. 12 is a perspective view showing a state where the framework structure of the headrest is switched to a form corresponding to FIG. 5.

As shown in FIG. 12, the upper side plate portion 12A of each side plate portion 12 is further pushed in a form of being raised inward around the first hinge shaft 14A in a form of leaving each lower side plate portion 12B as it is, and thus each upper side portion 3A of the headrest 1 can be switched to the form shown in FIG. 5.

Figure 13:
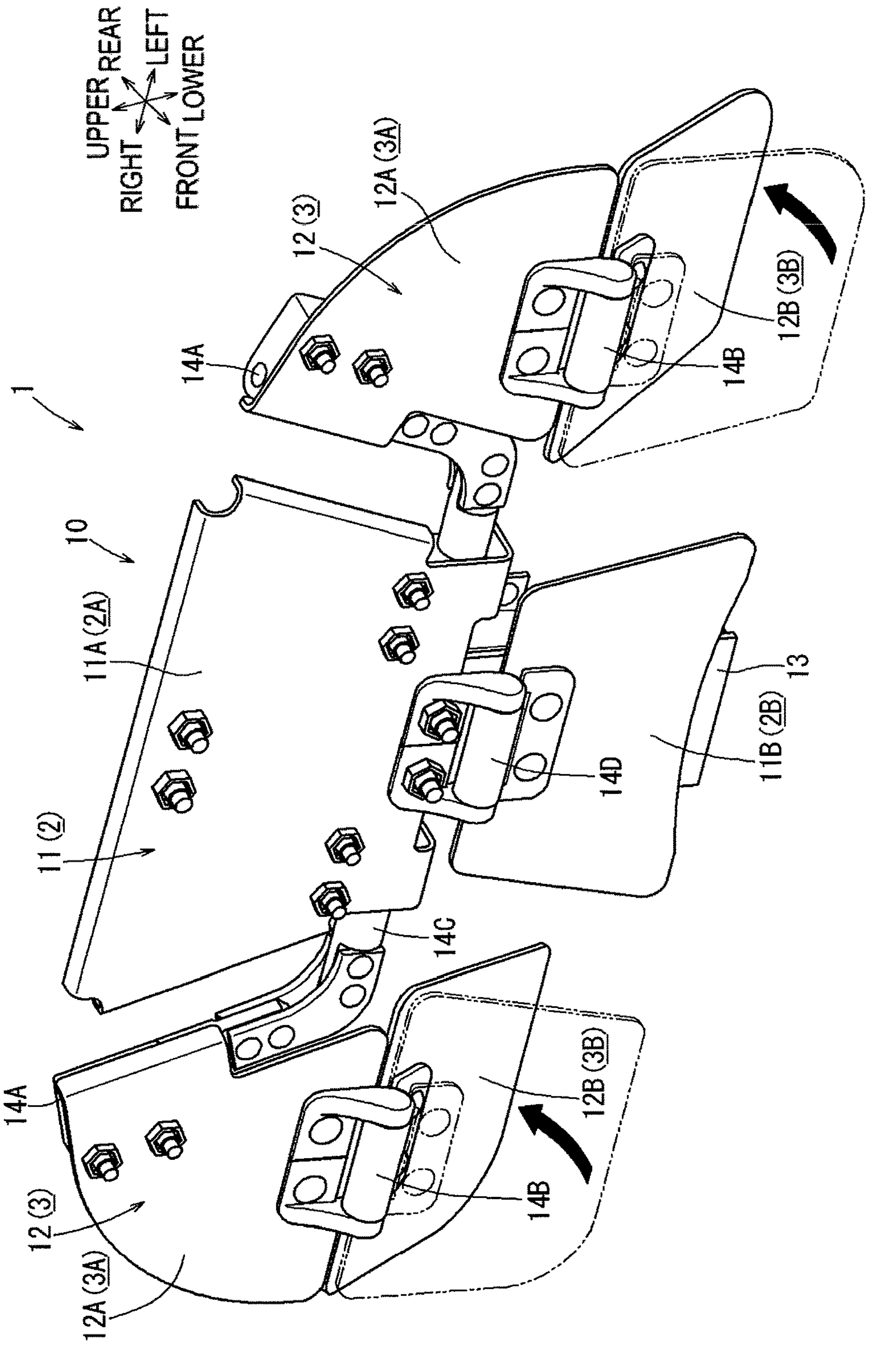
FIG. 13 is a perspective view showing a state where the framework structure of the headrest is switched to a form corresponding to FIG. 6.

Also, as shown in FIG. 13, the lower side plate portion 12B of each side plate portion 12 is pushed in a form of being retracted rearward, from the initial state shown in FIG. 7, with respect to the upper main plate portion 11A around the second hinge shaft 14B in a form of leaving the upper side plate portion 12A as it is, and thus each lower side portion 3B of the headrest 1 can be switched to the form shown in FIG. 6.

Incidentally, a rotation posture of each upper side plate portion 12A with respect to the upper main plate portion 11A and a rotation posture of each lower side plate portion 12B with respect to each upper side plate portion 12A are kept in a state of being locked by resistance force of sliding friction against the rotation around the first hinge shaft 14A, each second hinge shaft 14B, and the third hinge shaft 14C. Each second hinge shaft 14B is set at a height position substantially same as the third hinge shaft 14C.

The pad 20 set on the internal frame 10 is configured such that a part thereof set on the main portion 2 of the headrest 1 and a part thereof set on each side portion 3 are separated from each other. Also, a cover 30 covering the surface of the pad 20 is configured such that the entire front surface of the headrest 1 is covered by one continuous cover piece, but a part of the cover 30 covering the upper main portion 2A of the main portion 2 and a part of cover 30 covering the upper side portion 3A of each side portion 3 are disconnected with each other so as to cover these portions individually. With the above configuration, when the upper side portion 3A of each side portion 3 is greatly tilted down forward as shown in FIG. 4, the form can be switched without stretching the cover 30.

Summary

In summary, the headrest 1 of the embodiment has the following configuration. That is, a vehicle headrest (headrest 1) includes a main portion (main portion 2 (main plate portion 11)) including a central part of a front surface of the head rest; a side portion (side portion 3 (side plate portion 12)) forming a side part of the front surface of the headrest, the side portion (side portion 3 (side plate portion 12)) including a lower side portion (lower side plate portion 12B)) on a lower side and an upper side portion (upper side portion 3A (upper side plate portion 12A)) on an upper side which are divided from each other in a height direction; a first hinge shaft (first hinge shaft 14A) coupling the side portion (side portion 3 (side plate portion 12)) to the main portion (main portion 2 (main plate portion 11)) in a state where the side portion is capable of protruding forward to a side support position by being rotated around an axis which extends in the height direction and is inclined downward and inward in s width direction, the side support position being a position at which a head of a seated person is capable of being supported by the side portion (side portion 3 (side plate portion 12)) from a lateral side thereof; and a second hinge shaft (second hinge shaft 14B) coupling the lower side portion (lower side portion 3B (lower side plate portion 12B)) to the upper side portion (upper side portion 3A (upper side plate portion 12A)) in a state where the lower side portion is capable of being raised forward around an axis extending in the width direction.

With such a configuration, the side portion (side portion 3 (side plate portion 12)) protrudes forward with respect to the main portion (main portion 2 (main plate portion 11)) by being rotated around the first hinge shaft (the first hinge shaft 14A), and thus the side portion (side portion 3 (side plate portion 12)) can be set to a side support state where the head of the seated person can be supported from a lateral side thereof. Further, the lower side portion (lower side portion 3B (lower side plate portion 12B)) of the side portion (side portion 3 (side plate portion 12)) is raised forward with respect to the upper side portion (upper side portion 3A (upper side plate portion 12A)) around the second hinge shaft (second hinge shaft 14B), and thus the side portion can be set to a state of supporting the head of the seated person from the lower side thereof by the lower side portion (lower side portion 3B (lower side plate portion 12B)) while being brought to the side support state by the upper side portion (upper side portion 3A (upper side plate portion 12A)).

Also, the vehicle headrest (headrest 1) further includes a third hinge shaft (third hinge shaft 14C) which couples the first hinge shaft (first hinge shaft 14A) to the main portion (main portion 2 (main plate portion 11)) and extends inward in the width direction from a lower end of the first hinge shaft (first hinge shaft 14A). The side portion (side portion 3 (side plate portion 12)) is configured to be tilted down forward with respect to the main portion (main portion 2 (main plate portion 11)) around an axis of the third hinge shaft (third hinge shaft 14C) which extends in the width direction.

With such a configuration, the side portion (side portion 3 (side plate portion 12)) is tilted down forward around the third hinge shaft (third hinge shaft 14C), and thus the side portion (side portion 3 (side plate portion 12)) can be set to a state of supporting a laterally laid head of the seated person.

Further, the main portion (main portion 2 (main plate portion 11)) includes a lower main portion (lower main portion 2B (lower main plate portion 11B)) on the lower side and an upper main portion (upper main portion 2A (upper main plate portion 11A)) on the upper side which are divided from each other in the height direction The vehicle headrest (headrest 1) further includes a fourth hinge shaft (fourth hinge shaft 14D) which couples the lower main portion (lower main portion 2B (lower main plate portion 11B)) to the upper main portion (upper main portion 2A (upper main plate portion 11A)) in a state where the lower main portion (lower main portion 2B (lower main plate portion 11B)) is capable of being raised forward around an axis extending in the width direction.

With such a configuration, the lower main portion (lower main portion 2B (lower main plate portion 11B)) of the main portion (main portion 2 (main plate portion 11)) is raised forward with respect to the upper main portion (upper main portion 2A (upper main plate portion 11A)) around the fourth hinge shaft (fourth hinge shaft 14D), and thus the main portion can be set to a state of supporting the head of the seated person from the lower side thereof by the lower main portion (lower main portion 2B (lower main plate portion 11B)) while being brought to a state of supporting the head of the seated person by the upper main portion (upper main portion 2A (upper main plate portion 11A)). Therefore, it is possible to support the head of the seated person in a form of wrapping the head widely from the lower side thereof by the lower main portion (lower main portion 2B (lower main plate portion 11B)) and the lower side portion (lower side portion 3B (lower side plate portion 12B)).

Embodiment 2

Figure 14:
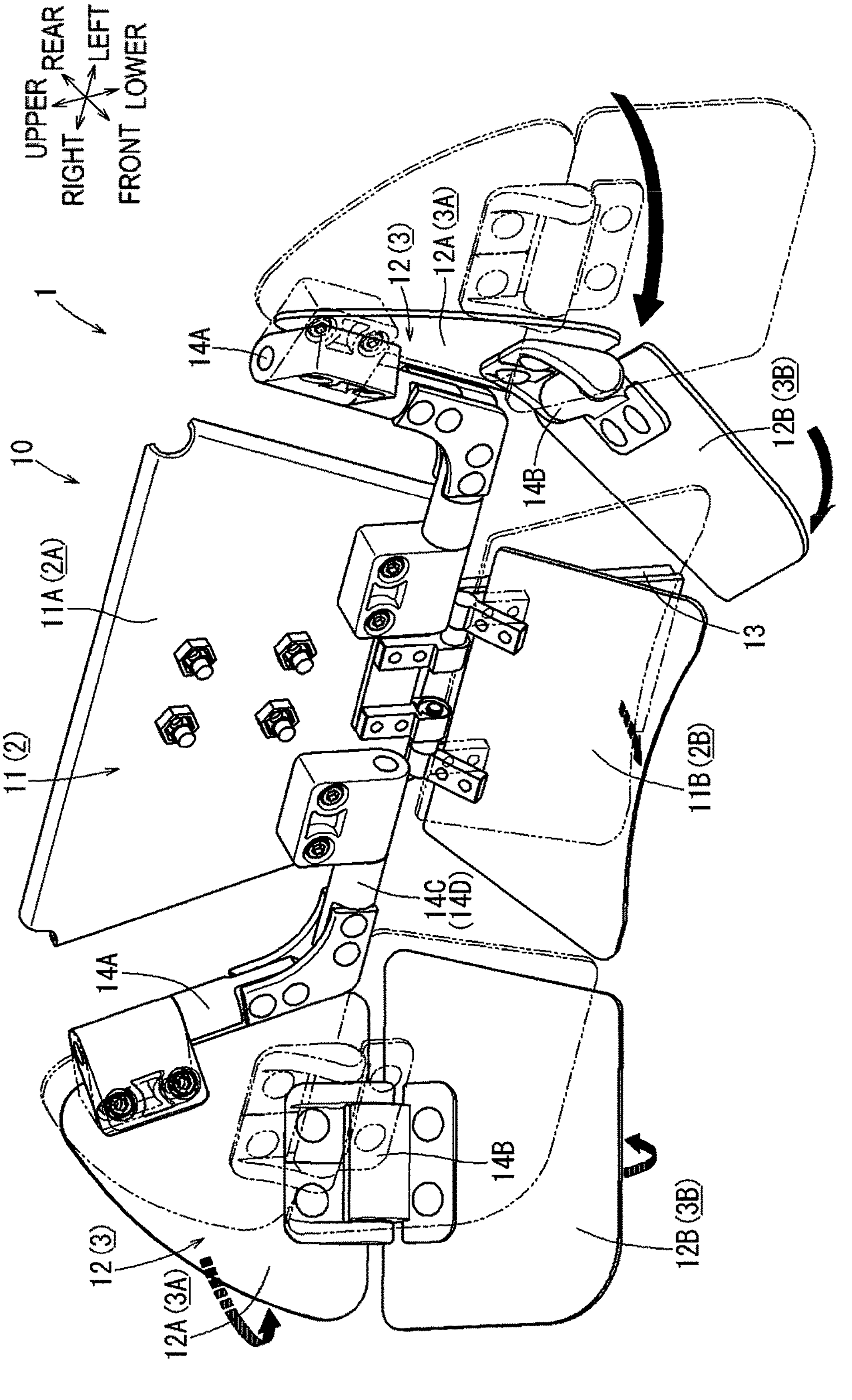
FIG. 14 is a perspective view showing a framework structure of a headrest according to Embodiment 2.
Figure 15:
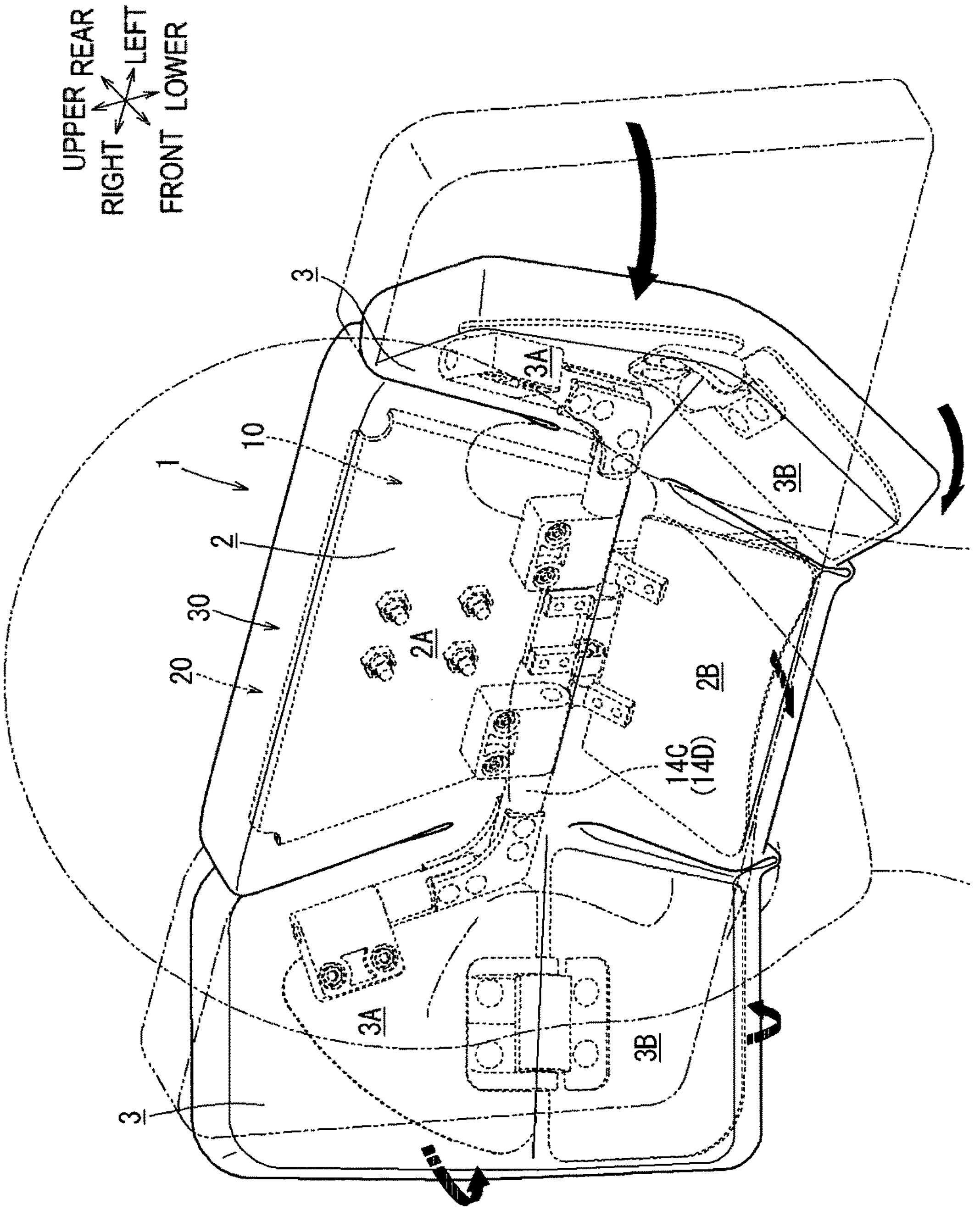
FIG. 15 is a perspective view showing a state where the framework structure of the headrest according to the Embodiment 2 is switched to a form corresponding to FIG. 3.

Next, a configuration of a headrest 1 according to Embodiment 2 will be described with reference to FIGS. 14 to 15. In the embodiment, as shown in FIG. 14, the fourth hinge shaft 14D for coupling the lower main plate portion 11B to the upper main plate portion 11A in a form where the lower main plate portion 11B is raised forward around an axis extending in the width direction is configured by the third hinge shaft 14C to be coaxial. Accordingly, the third hinge shaft 14C is attached to a front surface of the upper main plate portion 11A in this embodiment. Also, the first hinge shafts 14A coupled on both ends of the third hinge shaft 14C are also attached to a front surface of each upper side plate portion 12A.

With the above configuration, the third hinge shaft 14C (the fourth hinge shaft 14D) is disposed at a position on a coaxial line with each second hinge shaft 14B for coupling each lower side plate portion 12B to each upper side plate portion 12A in a form where the lower side plate portion 12B is raised forward around an axis extending in the width direction. Therefore, as shown in FIG. 15, when each lower side portion 3B (lower side plate portion 12B) and the lower main portion 2B (lower main plate portion 11B) are raised in a form corresponding to FIG. 3, each lower side portion 3B (lower side plate portion 12B) and the lower main portion 2B (lower main plate portion 11B) of the headrest 1 can support the head of the seated person in a way of wrapping the head from an obliquely lower side with a connection shape having a more continuous feeling.

Other Embodiments

Modes for carrying out the disclosure has been described with two embodiments, but the disclosure can be carried out in various modes other than the above embodiments. For example, the vehicle headrest of the disclosure can be applied to not only a seat of an automobile, but also to seats for cars other than automobiles such as trains, and seats provided for other vehicles such as aircrafts and ships. Also, the side portion may be provided on one side of right and left sides of the main portion, instead of being provided on both left and right sides thereof.

What is claimed is:

1. A vehicle headrest comprising:
- a main portion including a central part of a front surface of the headrest;
- a side portion including a side part of the front surface of the headrest, the side portion including a lower side portion on a lower side and an upper side portion on an upper side which are divided from each other in a height direction of the headrest;
- a first hinge shaft having an axis that extends in the height direction, the first hinge shaft being coupled to the side portion such that the side portion is rotatable around the axis relative to the main portion in a forward direction of the headrest to a side support position in which the side portion is inclined downward and inward in a width direction of the headrest, the side support position being a position at which the side portion supports a head of a seat person from a lateral side thereof; and
- a second hinge shaft having an axis that extends in the width direction, the second hinge shaft coupling the lower side portion to the upper side portion such that the lower side portion is raisable in the forward direction around the axis of the second hinge,
- wherein the side portion is configured to be tilted down in the forward direction of the head rest with respect to the main portion around an axis which extends in the width direction.

2. The vehicle headrest according to claim 1, further comprising:
- a third hinge shaft which couples the first hinge shaft to the main portion and extends inward in the width direction from a lower end of the first hinge shaft, wherein
- the axis is an axis of the third hinge shaft which extends in the width direction.

3. The vehicle headrest according to claim 2,
- wherein the main portion includes a lower main portion on the lower side and an upper main portion on the upper side which are divided from each other in the height direction, and
- wherein the headrest further comprises a fourth hinge shaft having an axis that extends in the width direction, the fourth hinge shaft coupling the lower main portion to the upper main portion such that the lower main portion is raisable in the forward direction around the axis of the fourth hinge shaft.

4. The vehicle headrest according to claim 1, wherein the main portion includes a lower main portion on the lower side and an upper main portion on the upper side which are divided from each other in the height direction, and wherein the headrest further comprises a fourth hinge shaft having an axis that extends in the width direction, the fourth hinge shaft coupling the lower main portion to the upper main portion such that the lower main portion is raisable in the forward direction around the axis of the fourth hinge shaft.

* * * * *